United States Patent
Chen (10) Patent No.: US 9,013,130 B2
(45) Date of Patent: Apr. 21, 2015

(54) METHOD OF CONTROLLING TORQUE OUTPUT OF IMPACT POWER TOOL AND THE CONTROL APPARATUS

(71) Applicant: Mobiletron Electronics Co., Ltd., Taichung (TW)

(72) Inventor: Chun-Cheng Chen, Taichung (TW)

(73) Assignee: Mobiletron Electronics Co., Ltd., Taichung (TW)

(*) Notice: Subject to any disclaimer, the term of this patent is extended or adjusted under 35 U.S.C. 154(b) by 256 days.

(21) Appl. No.: 13/691,962

(22) Filed: Dec. 3, 2012

(65) Prior Publication Data
US 2014/0042951 A1 Feb. 13, 2014

(30) Foreign Application Priority Data
Aug. 7, 2012 (TW) .............................. 101128425 A (51) Int. Cl.
*H02P 7/06* (2006.01)
*H02P 31/00* (2006.01)
*H02P 29/00* (2006.01)
*H02P 23/14* (2006.01)
*H02J 7/00* (2006.01)

(52) U.S. Cl.
CPC ............ *H02P 31/00* (2013.01); *H02P 29/0033* (2013.01); *H02P 23/14* (2013.01); *H02J 2007/0067* (2013.01)

(58) Field of Classification Search
USPC ......... 318/432, 433, 434, 445, 452–455, 459, 318/478–479, 484, 504
See application file for complete search history.

(56) References Cited

U.S. PATENT DOCUMENTS 8,704,468 B2 * 4/2014 Rottmerhusen ............... 318/381

* cited by examiner

*Primary Examiner* — Bentsu Ro
(74) *Attorney, Agent, or Firm* — Ming Chow; Sinorica, LLC (57) ABSTRACT

An impact power tool includes a motor, a battery, a hammer mechanism and a control apparatus. The motor runs in the same speed no matter what torque level is selected. The motor runs for a total running time which is identical to an impacting time plus a compensative time. The impacting time is decided according to the selected torque level, and the compensative time is decided according to the power of the battery. An impacting time table and a compensative time table are pre-established to decide the impacting time value and the compensative time value. Therefore, the impact power tool always provides the theory torque output of the selected torque even if the battery is low.

15 Claims, 5 Drawing Sheets

| Torque levels | Impacting time values |
|---|---|
| 1 | Ti1 |
| 2 | Ti2 |
| 3 | Ti3 |
| 4 | Ti4 |
| 5 | Ti5 |

FIG. 1

| Voltage values | Torque levels | Compensative time values |
|---|---|---|
| V1 | 1 | Tc11 |
| V1 | 2 | Tc12 |
| V1 | 3 | Tc13 |
| V1 | 4 | Tc14 |
| V1 | 5 | Tc15 |
| V2 | 1 | Tc21 |
| V2 | 2 | Tc22 |
| V2 | 3 | Tc23 |
| V2 | 4 | Tc24 |
| V2 | 5 | Tc25 |
| V3 | 1 | Tc31 |
| V3 | 2 | Tc32 |
| V3 | 3 | Tc33 |
| V3 | 4 | Tc34 |
| V3 | 5 | Tc35 |
| ⋮ | ⋮ | ⋮ |

METHOD OF CONTROLLING TORQUE OUTPUT OF IMPACT POWER TOOL AND THE CONTROL APPARATUS

BACKGROUND OF THE INVENTION

1. Field of the Invention

The present invention relates generally to a power tool, and more particularly to a method of controlling a torque output of an impact power tool, and the control apparatus of the impact power tool.

2. Description of the Related Art

A conventional impact tool, take impact wrench for example, is provided with a motor and a hammer mechanism to make the wrench to repeatedly hammer an object, such as a screw. The output torque of the impact wrench is increasing along with the times of the wrench hammering the screw. The conventional impact wrench outputs a constant torque level only when a user pulls the trigger once so that it can't tighten a screw while the torque is too low, and it will damage the screw while the torque is too high.

An improved impact wrench which may adjust the output torque had been provided to the market. This kind of impact wrench provides several levels of torque by pulse width modulation (PWM). The motor provides different speeds in each level because the duty cycle of the pulse widths which drive the motor are different for each level. The times of the hammer mechanism being activated will increase while the speed of the motor is high so that the torque output in high speed level is greater than in low speed level. However, the speed of the motor decreases with the low battery that makes a difference between the motor's speed and the output torque, and therefore the torque control is not precise. Besides, it will take a long time to turn the screw while the impact wrench is switched to a low torque level. Therefore, the conventional impact wrench still needs to be improved.

SUMMARY OF THE INVENTION

The primary objective of the present invention is to provide an impact power tool, which is able to precisely control the torque output and shorten the turning time in the low torque level.

According to the objective of the present invention, the present invention provides a control apparatus of an impact power tool. The impact power tool further has a battery and a motor. The control apparatus includes a switch electrically connected to the battery; a voltage converting circuit electrically connected to the switch to convert a voltage of the battery into a first voltage when the switch is turned on; a driving circuit electrically connected to the motor to drive the motor; a torque level switching circuit having an interface for a user to operate, wherein the interface has a plurality of torque levels to select and the torque level switching circuit generates a torque level signal according to the selected torque level; a current converting circuit electrically connected to the motor to convert a current of the motor into a second voltage; and a controller respectively electrically connected to the switch and the driving circuit to send a starting signal to the driving circuit to start the motor when the switch is turned on. The controller further respectively is electrically connected to the torque level switching circuit, the voltage converting circuit and the current converting circuit to receive the torque level signal, the first voltage and the second voltage. The controller includes a memory and a timer. The memory stores a plurality of voltage values, torque levels, impacting time values, compensative time values and a reference voltage. Each of the torque levels respectively indexes one of the impacting time values, and each of the voltage values respectively indexes all the torque levels and each of the torque levels indexes one of the compensative time values.

The timer starts to count a total running time when the second voltage is identical to the reference voltage, and then the motor is stopped when the total running time is up, wherein the total running time is identical to the impacting time value of the selected torque level.

The timer starting to count a total running time when the first voltage is identical to one the voltage values and the second voltage is identical to the reference voltage, and then the motor is stopped when the total running time is up, wherein the total running time is identical to the impacting time value of the selected torque level plus the compensative time value of the voltage value and the selected torque level.

The present invention further provides a method of controlling a torque output of an impact power tool. The impact power tool has a plurality of torque levels to be selected by a user. The impact power tool has a battery and a motor. An impact time table, a compensative time table and a reference voltage are pre-established in the impact power tool. The impact time table has a plurality of torque levels and impact time values, in which each of the torque levels indexes one of the impacting time values. The compensative time table has a plurality of voltage values, the torque levels and compensative time values, in which each of the voltage values respectively indexes all the torque levels and each of the torque levels indexes one of the compensative time values. The method includes the steps of:

A. Start the motor and obtain a voltage of the battery and a current of the motor, and then convert the voltage of the battery into a first voltage and convert the current of the motor into a second voltage;

B. Obtain the impacting time value from the impact time table according to the selected torque level; and C. Compare the first voltage with the voltage values of the compensative time table and compare the second voltage with the reference voltage, and then perform either of the following sub-steps:

C1. Start to count a total running time when the first voltage is identical to one of the voltage values of the compensative time table and the second voltage is identical to the reference voltage, and then stop the motor when the total running time is up, wherein the total running time is identical to the impacting time value of the selected torque level plus the compensative time value of the selected torque level and the voltage value which is identical to the first voltage; otherwise C2. Start to count a total running time when the second voltage is identical to the reference voltage, and then stop the motor when the total running time is up, wherein the total running time is identical to the impacting time value of the selected torque level.

The sub-step C2 is performed only if the first voltage does not satisfy the sub-step C1.

Therefore, the impact power tool always provides the preset torque output of the selected torque level even when the battery is low.

DETAILED DESCRIPTION OF THE INVENTION

The detailed description and technical contents of the present invention will be explained with reference to the accompanying drawings. However, the drawings are illustrative only but not used to limit the present invention.

Figure 1:
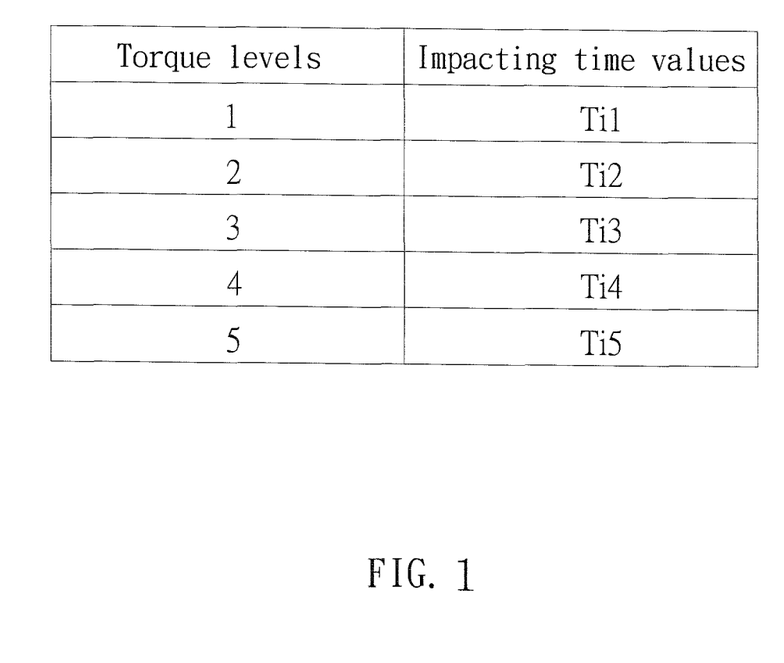
FIG. 1 is a table of the impacting time of a preferred embodiment of the present invention.
Figure 2:
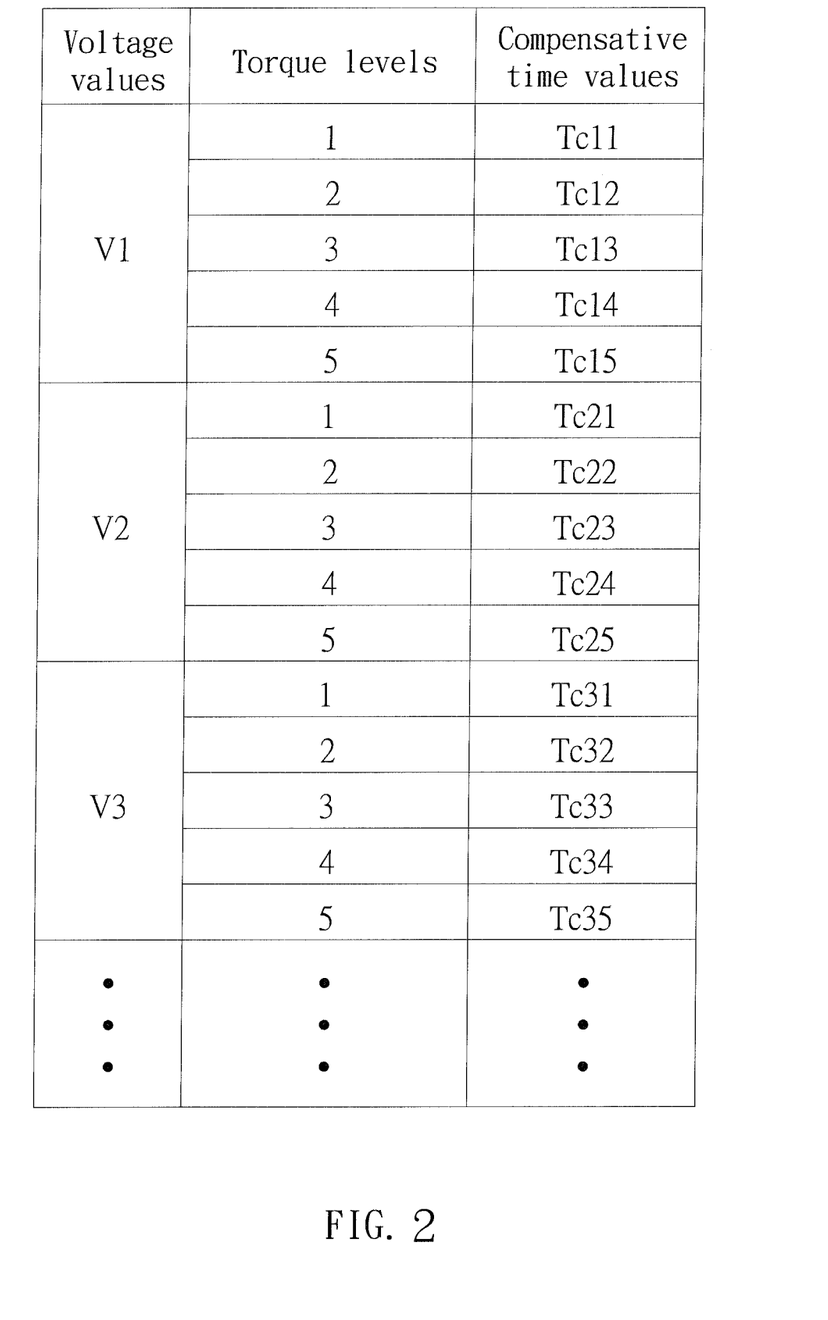
FIG. 2 is a table of the compensative time of the preferred embodiment of the present invention.

A method of the present invention is to precisely control a torque output of an impact power tool. The impact power tool allows a user to select torque levels. The impact power tool has a battery, a motor and a hammering mechanism to be driven by the motor. Before performing the method of the present invention an impacting time table, a compensative time table, and a reference voltage are pre-established. As shown in FIG. 1, the impacting time table has a plurality of torque levels and impacting time values (five torque levels and five impacting time values are shown in the table). The torque levels respectively index one of the impacting time values. When the impact power tool is switched to a specific torque level, the power tool will run for the impacting time values of the selected torque level to provide a specific torque output. As shown in FIG. 2, the compensative time table has several voltage values, the torque levels and compensative time values. Each voltage value indexes all the five torque levels, and each torque level indexes one of the compensative time values. The compensative time value plus the impacting time value is a total running time of the impact power tool while a specific torque level is selected and a specific voltage of the battery is detected to ensure that the power tool provides the preset torque output under the selected torque level without the effect of power decreasing of the battery.

Figure 3:
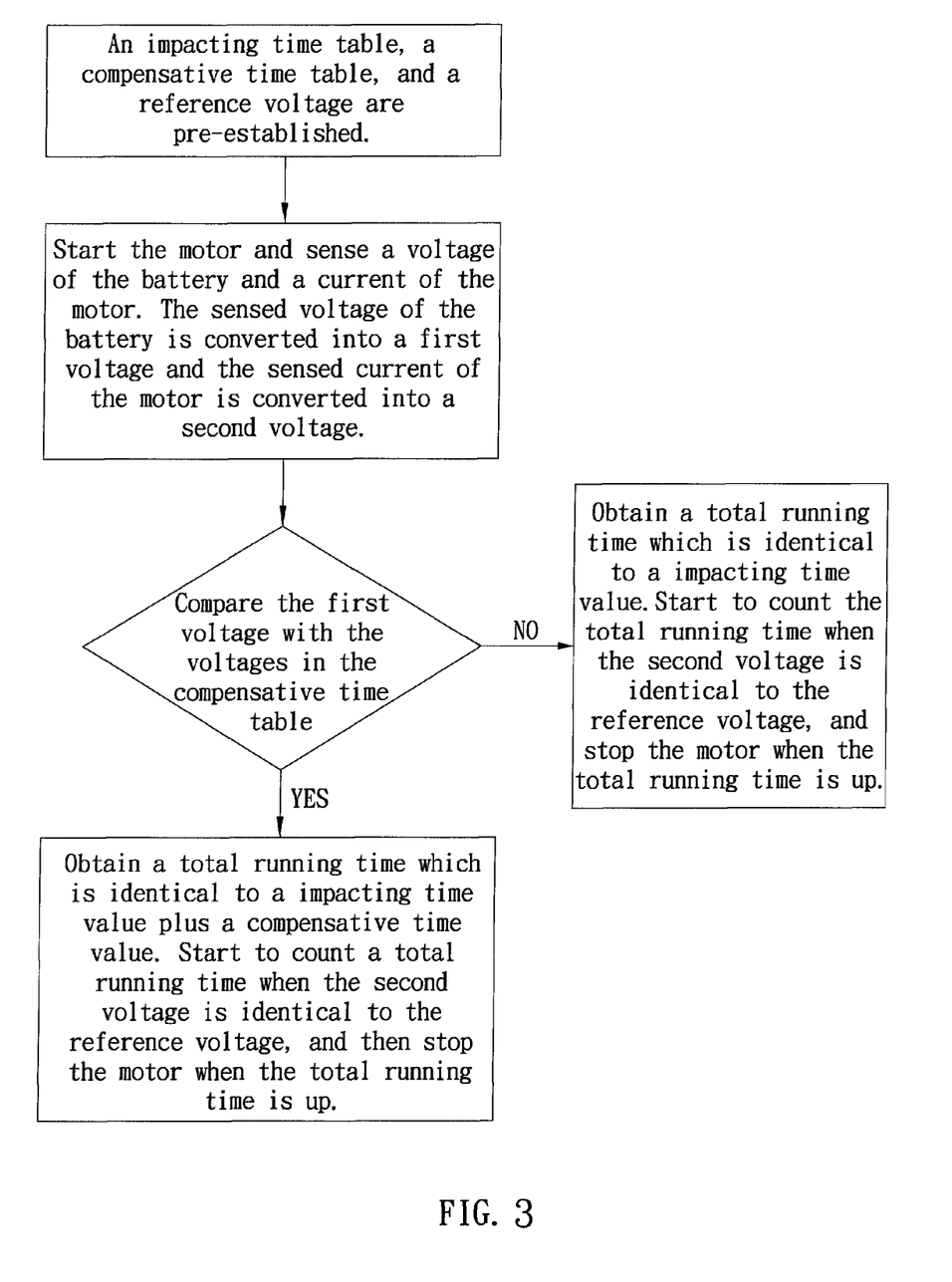
FIG. 3 is a flow chart of the method of controlling the hammering of the preferred embodiment of the present invention.

As shown in FIG. 3, the method includes the following steps:

A. Start the motor and sense a voltage of the battery and a current of the motor. The sensed voltage of the battery is converted into a first voltage and the sensed current of the motor is converted into a second voltage. The motor is driven by the highest voltage of the battery to run in the highest speed in all the torque levels. The voltage of the battery is monitored since the power tool is activated for the following steps.

B. Obtain a torque level in the impacting time table according to an output torque level which is selected by a user, and then obtain an impacting time value according to the selected torque level. For example, when the user finds a switch, which is designed for selecting the output torque level, and switches the switch to level 4, it indicates the torque level 4 in the impacting time table (FIG. 1), and then it would be easy to obtain the corresponding impacting time value, Ti4.

C. Compare the first voltage with the voltages in the compensative time table, and then perform one of the following sub-steps:

C1. If the first voltage is identical to one of the voltage values, and then obtain a compensative time value according to the voltage value and the selected torque level. For example, if the first voltage is identical to V2 and the torque level is 4, it will obtain the corresponding compensative time value, Tc24, in the compensative time value column of the compensative time table (FIG. 2). Next, obtain a total running time which is identical to the impacting time value plus the compensative time value. Start to count the total running time when the second voltage is identical to the reference voltage, and then stop the motor when the total running time is up. The decreasing of the voltage of the battery makes the speed of the motor decreasing therefore the times of the power tool hammering the screw will be less than the theory times. The present invention provides the compensative time value according to the voltage of the battery so that we can make sure that the power tool provides the theory torque output without the battery's issue. The second voltage will increase with the power tool tightening the screw (the resistance from the screw makes the second voltage increasing). The reference voltage is the theory voltage of the motor when the impact mechanism starts to hammer so that the total running time will start while the second voltage reaches to the reference voltage.

C2. Start to count the total running time when the second voltage is identical to the reference voltage, and stop the motor when the total running time is up. In this step, the battery is full and the total running time is identical to the impacting time value only.

If the condition of the step C1 is satisfied, which means that the current voltage of the battery is low and the total running time should be the impacting time value plus the compensative time value. The step C2 indicates that the battery is full and the total running time is the impacting time value only (or the compensative time value is zero). No matter perform the step C1 or the step C2, the power tool will provide the theory torque output of the selected torque level.

In an embodiment, a standard voltage is provided, which is greater than all the voltage values in the compensative time table. Therefore, the step C further includes the sub-step C3, and the sub-step C2 is performed only if the conditions of the sub-steps C1 and C3 are not satisfied.

In the sub-step C3, if the first voltage is between the standard voltage and the highest voltage value, the total running time is the impacting time value (obtained in the step B) plus the compensate time value of the highest voltage value and the selected torque level, and then start to count the total running time when the second voltage is identical to the reference voltage, and then stop the motor when the total running time is up.

In the aforesaid step when the first voltage is lower than the standard voltage, it indicates that the battery is not full and it has to add the compensate time value to provide the sufficient torque output of the selected torque level. While the first voltage is greater than the standard voltage, it indicates that the battery is full and the sub-step C2 is performed (no compensate time value).

In an embodiment, the step C further includes the sub-step C3, and the sub-step C2 is performed only if the conditions of the sub-steps C1 and C3 are not satisfied.

In the sub-step C3, if the first voltage is between the highest voltage value and the lowest voltage value and is not identical to any of the voltage values, the total running time is the impacting time value (obtained in the step B) plus the compensate time value of the selected torque level and the voltage value, which is lower than the first voltage and is closest to first voltage, and then start to count the total running time when the second voltage is identical to the reference voltage, and stop the motor when the total running time is up. An alternate way is that the total running time is the impacting time value (obtained in the step B) plus the compensate time value of the selected torque level and the voltage value, which is higher than the first voltage and is closest to first voltage. The total running time also may be the impacting time value (obtained in the step B) plus the compensate time value of the selected torque level and the voltage, which is closest to first voltage.

In an embodiment, the step C further includes the sub-step C3, and the sub-step C2 is performed only if the conditions of the sub-steps C1 and C3 are not satisfied.

In the sub-step C3, if the first voltage is lower than the lowest voltage value, the motor is stopped immediately. In this step, it indicates that the battery is too low to drive the motor, so that it has to cut off the power to protect the battery.

The step C is to find the very compensate time value according to the current voltage of the battery. All the sub-steps C1, C2 and C3 may be used at the same time. In an embodiment, the highest voltage value is identical to the standard voltage. In other words, if the first voltage is greater than the highest voltage value, it means that the battery is full and it doesn't need the compensate time value, and the total running time should be added with the compensate time value while the first voltage is lower than or identical to the highest voltage value.

Figure 4:
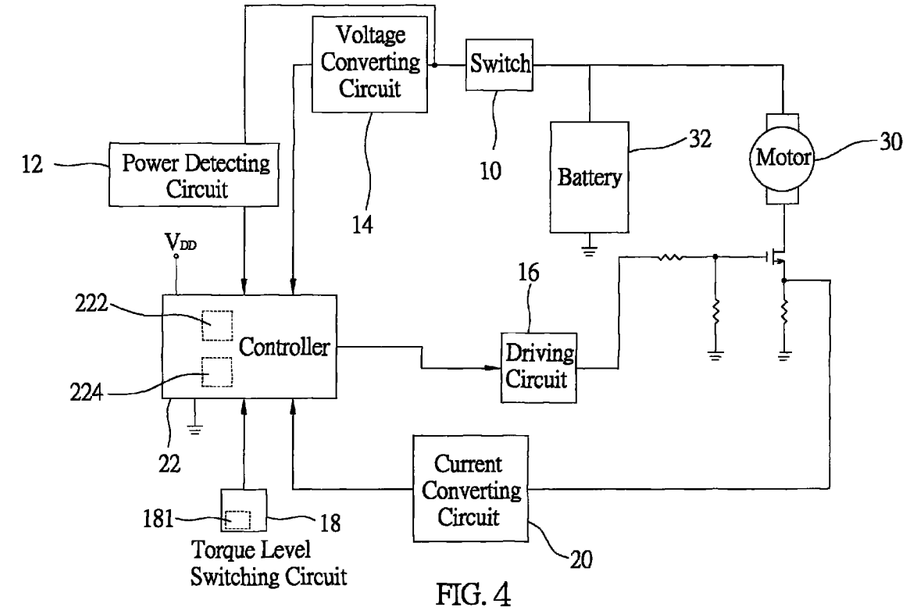
FIG. 4 is a block diagram of the control apparatus of the preferred embodiment of the present invention.

FIG. 4 shows a control apparatus of an impact power tool which performs the method of controlling the torque output of the impact power tool. The control apparatus is connected to the motor 30 and the battery 32 as described above, including a switch 10, a power detecting circuit 12, a voltage converting circuit 14, a driving circuit 16, a torque level switching circuit 18, a current converting circuit 20 and a controller 22.

The switch 10 is electrically connected to the battery 32 to turn on or turn off the impact power tool.

The power detecting circuit 12 is electrically connected to the switch 10 to convert the voltage of the batter 32 into a high-level power signal and output it.

The voltage converting circuit 14 is electrically connected to the switch 10 to convert the voltage of the battery 32 into the first voltage. In practice, the voltage converting circuit 14 proportionally reduces the voltage of the batter 32, and the first voltage is acceptable to the controller 22.

The driving circuit 16 is electrically connected to the motor 30 to drive the motor 30.

The torque level switching circuit 18 has an interface 181, and the interface 181 has a plurality of torque level items to be selected by a user. The torque level switching circuit 18 generates a torque level signal according to the selected item.

The current converting circuit 20 is electrically connected to the motor 30 to convert a current of the motor 30 into the second voltage, and the second voltage is acceptable to the controller 22. The second voltage is proportional to the current of the motor 30. The current converting circuit 20 converters the second voltage into a saturation voltage while the current of the motor 30 is identical to a reference current.

The controller 22 is electrically connected to the power detecting circuit 12, voltage converting circuit 14, the driving circuit 16, the torque level switching circuit 18, and the current converting circuit 20. The controller 22 has a memory 222 and a timer 224. The memory 222 stores the voltages, the torque levels, the impacting time values, and the compensate time values. Each torque level indexes an impacting time value accordingly, which means the impacting time table (FIG. 1) is stored in the memory 222. Each voltage value indexes all the torque levels and each torque level indexes a compensate time value, which means the compensate time table (FIG. 2) is stored in the memory 222 as well. Therefore, it may find the very impacting time value and the compensate time value according to the description above.

While the switch 10 is turned on, the controller 22 receives the power signal which indicates that the power is on. The controller 22 sends a starting signal to the driving circuit 16 and the driving circuit 16 drives the motor 30 to turn. The speed of the motor 30 is associated with the current voltage of the battery 32. The controller 22 receives the torque level signal and the first and the second voltages. The controller 22 finds the very impacting time value according to the torque level signal. The timer 224 starts to count the total running time when the second voltage is identical to the reference voltage, and the controller 22 cut off the power to stop the motor 30 when the total running time is up, wherein the total running time is identical to the impacting time value of the selected torque level. In this condition, the battery 32 is full and the impact power tool will provide the preset torque of the selected torque level before the power is off.

The timer 224 starting to count the total running time when the first voltage is identical to one of the voltage values and the second voltage is identical to the reference voltage, and then the motor 30 is stopped when the total running time is up, wherein the total running time is identical to the impacting time value of the selected torque level plus the compensative time value of the voltage value and the selected torque level. In this condition, the impact power tool will provide the preset torque of the selected torque level before the power is off even if the battery 32 is low.

Figure 5:
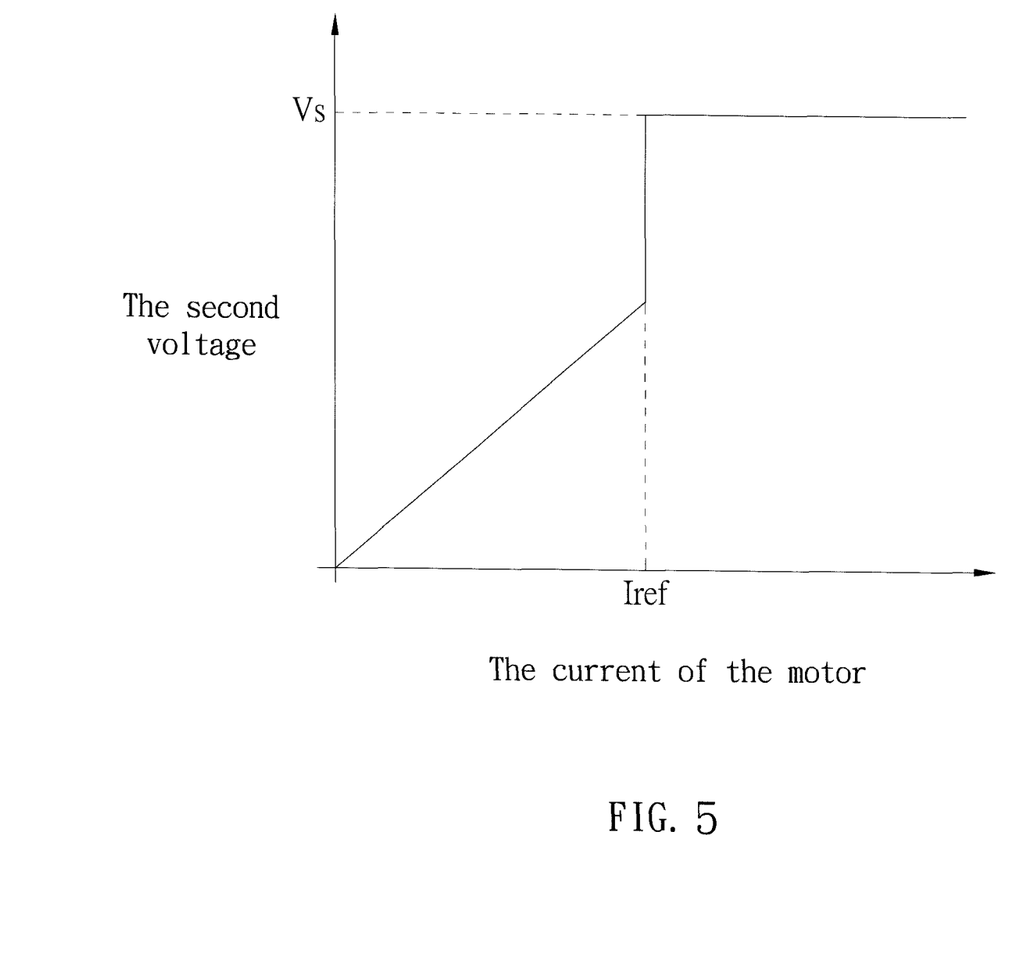
FIG. 5 is a diagram of the relationship between the second voltage and the current of the motor of the preferred embodiment of the present invention.

While the motor 30 has a loading, which means the screw is tightened, the current of the motor 30 is increasing with the loading, and so does the second voltage of the current converting circuit 20 (FIG. 5). As the current of the motor 30 reaches to the reference current Iref, the second voltage of the current converting circuit 20 reaches to the saturation voltage Vs. In an embodiment, the reference current Iref is the current of the motor 30 starting to activate the hammering mechanism, and it indicate the time of starting to impact when the second voltage reaches to the saturation voltage Vs. In an embodiment, an amplifier is provided to amplify the second voltage. The amplifier works in the linear area to linearly increase the second voltage with the current of the motor 30 when the current of the motor 30 is lower than the reference current Iref. While the current of the motor 30 reaches to the reference current Iref, the amplifier works in the saturation area to increase the second voltage to the saturation voltage Vs of the amplifier.

In an embodiment, the memory 222 pre-stores a standard voltage. The standard voltage is greater than all the voltage values stored in memory 222 While the first voltage is lower than the standard voltage and higher than the highest voltage value stored in memory 222 and the second voltage reaches to the reference voltage, the timer 224 is activated and the motor 30 will be stopped after the total running time is up. The total running time here is identical to the impacting time value of the selected torque level plus the compensative time value of the selected torque level and the highest voltage value.

In an embodiment, while first voltage is between the highest voltage value and the lowest voltage value but not identical to any of the voltage values stored in the memory 222 and the second voltage reaches to the reference voltage, the timer 224 is activated and the motor 30 will be stopped after the total running time is up. The total running time here is identical to the impacting time value of the selected torque level plus the compensative time value of the selected torque level and the voltage value which is lower than the first voltage and closest to the first voltage. An alternate way is selecting the voltage value which is higher than and closest to the first voltage, or simply is closest to the first voltage to determine the compensate time value.

While the first voltage is lower than the lowest voltage stored in the memory 222, the motor 30 is stopped immediately to prevent the battery 32 from over-discharge.

All the control modes as described in the embodiments above may be made in the same control apparatus to control the torque output of the impact power tool according to the battery 32. Besides, the standard voltage may be identical to the highest voltage value stored in memory 222, or it may indicate that the battery 32 is full when the first voltage is higher than the highest voltage value stored in memory 222. In this condition, no compensative time value is added.

The impact power tool of the present invention provides the motor 30 running in the highest speed and changes the running time of the motor 30 to adjust the torque output. The saturation voltage Vs of the current converting circuit is taken as the signal to start the timer. In order to precisely control the torque output of each selected torque level, the present invention further provides the compensative time value according to the voltage of the battery 32. The compensative time value will be longer when the battery 32 is getting lower so that the impact power tool of the present invention will provide the same torque output in the selected torque level without the effect of the battery 32.

The impact power tool of the present invention provides the motor 30 always running in the highest speed, in other words, the speed of the motor 30 will be the same no matter what torque level is selected, therefore it may turn the screw in a short time even when the low torque level is selected.

The description above is a few preferred embodiments of the present invention, and the equivalence of the present invention is still in the scope of claim construction of the present invention.

What is claimed is:

1. A control apparatus of an impact power tool, wherein the impact power tool further has a battery and a motor, the control apparatus comprising:

a switch electrically connected to the battery;

a voltage converting circuit electrically connected to the switch to convert a voltage of the battery into a fist voltage when the switch is turned on;

a driving circuit electrically connected to the motor to drive the motor;

a torque level switching circuit having an interface for a user to operate, wherein the interface has a plurality of torque levels to select and the torque level switching circuit generates a torque level signal according to the selected torque level;

a current converting circuit electrically connected to the motor to convert a current of the motor into a second voltage; and a controller respectively electrically connected to the switch and the driving circuit to send a starting signal to the driving circuit to start the motor when the switch is turned on;

the controller further respectively electrically connected to the torque level switching circuit, the voltage converting circuit and the current converting circuit to receive the torque level signal, the first voltage and the second voltage;

the controller including a memory and a timer; and the memory storing a plurality of voltage values, torque levels, impacting time values, compensative time values and a reference voltage, wherein each of the torque levels respectively indexes one of the impacting time values, and each of the voltage values respectively indexes all the torque levels and each of the torque levels indexes one of the compensative time values;

the timer starting to count a total running time when the second voltage is identical to the reference voltage, and then the motor is stopped when the total running time is up, wherein the total running time is identical to the impacting time value of the selected torque level;

the timer starting to count a total running time when the first voltage is identical to one of the voltage values and the second voltage is identical to the reference voltage, and then the motor is stopped when the total running time is up, wherein the total running time is identical to the impacting time value of the selected torque level plus the compensative time value of the voltage value and the selected torque level.

2. The control apparatus of the impact power tool as defined in claim 1, wherein the memory further stores a standard voltage, which is greater than all the voltage values, and the timer starts to count a total running time when the first voltage is between the standard voltage and the highest voltage value and the second voltage is identical to the reference voltage, and then the motor is stopped when the total running time is up, wherein the total running time is identical to the impacting time value of the selected torque level plus the compensative time value of the highest voltage value and the selected torque level.

3. The control apparatus of the impact power tool as defined in claim 1, wherein the timer starts to count a total running time when the first voltage is between two of the neighboring voltage values and the second voltage is identical to the reference voltage, and then the motor is stopped when the total running time is up, wherein the total running time is identical to the impacting time value of the selected torque level plus the compensative time value of the voltage value which is lower than the first voltage and is closest to the first voltage.

4. The control apparatus of the impact power tool as defined in claim 1, wherein the timer starts to count a total running time when the first voltage is between two of the neighboring voltage values and the second voltage is identical to the reference voltage, and then the motor is stopped when the total running time is up, wherein the total running time is identical to the impacting time value of the selected torque level plus the compensative time value of the voltage value which is higher than the first voltage and is closest to the first voltage.

5. The control apparatus of the impact power tool as defined in claim 1, wherein the timer starts to count a total running time when the first voltage is between two of the neighboring voltage value and the second voltage is identical to the reference voltage, and then the motor is stopped when the total running time is up, wherein the total running time is identical to the impacting time value of the selected torque level plus the compensative time value of the voltage value which is closest to the first voltage.

6. The control apparatus of the impact power tool as defined in claim 1, wherein the motor is stopped when the first voltage is lower than all the voltage values.

7. The control apparatus of the impact power tool as defined in claim 1, wherein the second voltage is positive proportional to the current of the motor; the current converting circuit converts the second voltage into a saturation voltage when the current of the motor is higher than a reference current; and the saturation voltage is identical to the reference voltage.

8. The control apparatus of the impact power tool as defined in claim 1, wherein the motor is driven by the highest voltage of the battery.

9. The control apparatus of the impact power tool as defined in claim 1, wherein the motor runs in the same speed for all the torque levels.

10. A method of controlling a torque output of an impact power tool, wherein the impact power tool has a plurality of torque levels to be selected by a user; the impact power tool has a battery and a motor; an impact time table, a compensative time table and a reference voltage are pre-established; the impact time table has a plurality of torque levels and impact time values, in which each of the torque levels indexes one of the impacting time values; the compensative time table has a plurality of voltage values, the torque levels and compensative time values, in which each of the voltage values respectively indexes all the torque levels and each of the torque levels indexes one of the compensative time values, the method comprising the steps of:
  A. starting the motor and obtaining a voltage of the battery and a current of the motor, and then converting the voltage of the battery into a first voltage and converting the current of the motor into a second voltage;
  B. obtaining the impacting time value from the impact time table according to the selected torque level; and
  C. comparing the first voltage with the voltage values of the compensative time table and comparing the second voltage with the reference voltage, and then performing either of the following sub-steps:
    C1. starting to count a total running time when the first voltage is identical to one of the voltage values of the compensative time table and the second voltage is identical to the reference voltage, and then stopping the motor when the total running time is up, wherein the total running time is identical to the impacting time value of the selected torque level plus the compensative time value of the selected torque level and the voltage value which is identical to the first voltage; otherwise
    C2. starting to count a total running time when the second voltage is identical to the reference voltage, and then stopping the motor when the total running time is up, wherein the total running time is identical to the impacting time value of the selected torque level;
  wherein the sub-step C2 is performed if the first voltage does not satisfy the sub-step C1.

11. The method as defined in claim 10, further comprising the sub-step C3 of starting to count a total running time when the first voltage is between a standard voltage, which is higher than all the voltage values of the compensative time table, and the highest voltage value and the second voltage is identical to the reference voltage, and then stopping the motor when the total running time is up, wherein the total running time is identical to the impacting time value of the selected torque level plus the compensative time value of the selected torque level and the highest voltage value, wherein the sub-step C2 is performed if the first voltage does not satisfy the sub-step C1 and the sub-step C3.

12. The method as defined in claim 10, further comprising the sub-step C3 of starting to count a total running time when the first voltage is between two of the neighboring voltage values of the compensative time table and the second voltage is identical to the reference voltage, and then stopping the motor when the total running time is up, wherein the total running time is identical to the impacting time value of the selected torque level plus the compensative time value of the selected torque level and the voltage value, which is lower than the first voltage and is closest to the first voltage, wherein the sub-step C2 is performed if the first voltage does not satisfy the sub-step C1 and the sub-step C3.

13. The method as defined in claim 10, further comprising the sub-step C3 of starting to count a total running time when the first voltage is between two of the neighboring voltage values of the compensative time table and the second voltage is identical to the reference voltage and then stopping the motor when the total running time is up, wherein the total running time is identical to the impacting time value of the selected torque level plus the compensative time value of the selected torque level and the voltage value, which is higher than the first voltage and is closest to the first voltage, wherein the sub-step C2 is performed if the first voltage does not satisfy the sub-step C1 and the sub-step C3.

14. The method as defined in claim 10, further comprising the sub-step C3 of starting to count a total running time when the first voltage is between two of the neighboring voltage values of the compensative time table and the second voltage is identical to the reference voltage and then stopping the motor when the total running time is up, wherein the total running time is identical to the impacting time value of the selected torque level plus the compensative time value of the selected torque level and the voltage value, which is closest to the first voltage, wherein the sub-step C2 is performed if the first voltage does not satisfy the sub-step C1 and the sub-step C3.

15. The method as defined in claim 10, further comprising the sub-step C3 of stopping the motor when the first voltage is lower than all the voltage values of the compensative time table, wherein the sub-step C2 is performed if the first voltage does not satisfy the sub-step C1 and the sub-step C3.

* * * * *